INVENTOR.
DONALD W. GARNETT
BY Whittemore Hulbert
Belknap
ATTORNEYS

United States Patent Office 3,435,995
Patented Apr. 1, 1969

3,435,995
MULTIPLE STAGE VIBRATORY MATERIAL SUPPLY STRUCTURE
Donald W. Garnett, Grand Ledge, Mich., assignor to The Olofsson Corporation, Lansing, Mich., a corporation of Michigan
Filed June 15, 1965, Ser. No. 464,124
Int. Cl. B65g 3/12, 65/70; B67d 5/52
U.S. Cl. 222—199                     19 Claims

ABSTRACT OF THE DISCLOSURE

A plurality of receptacles are overlapped longitudinally in vertically cascaded order; and individual vibratory units for the receptacles include a dual leaf spring suspension having an elongated bar secured at opposite ends to the receptacle and the vibratory unit. Each bar is at a right angle to the leaf springs, vibration being transmitted along and through the bar to the receptacle. Multiple provisions are made for an accurate setting of the vibratory characteristic of the mechanism by adjusting the air gap of electromagnetic components, inertially counterweighting the vibratory unit, selecting leaf spring flexibility, and providing fine tuning means.

---

Figure 1:
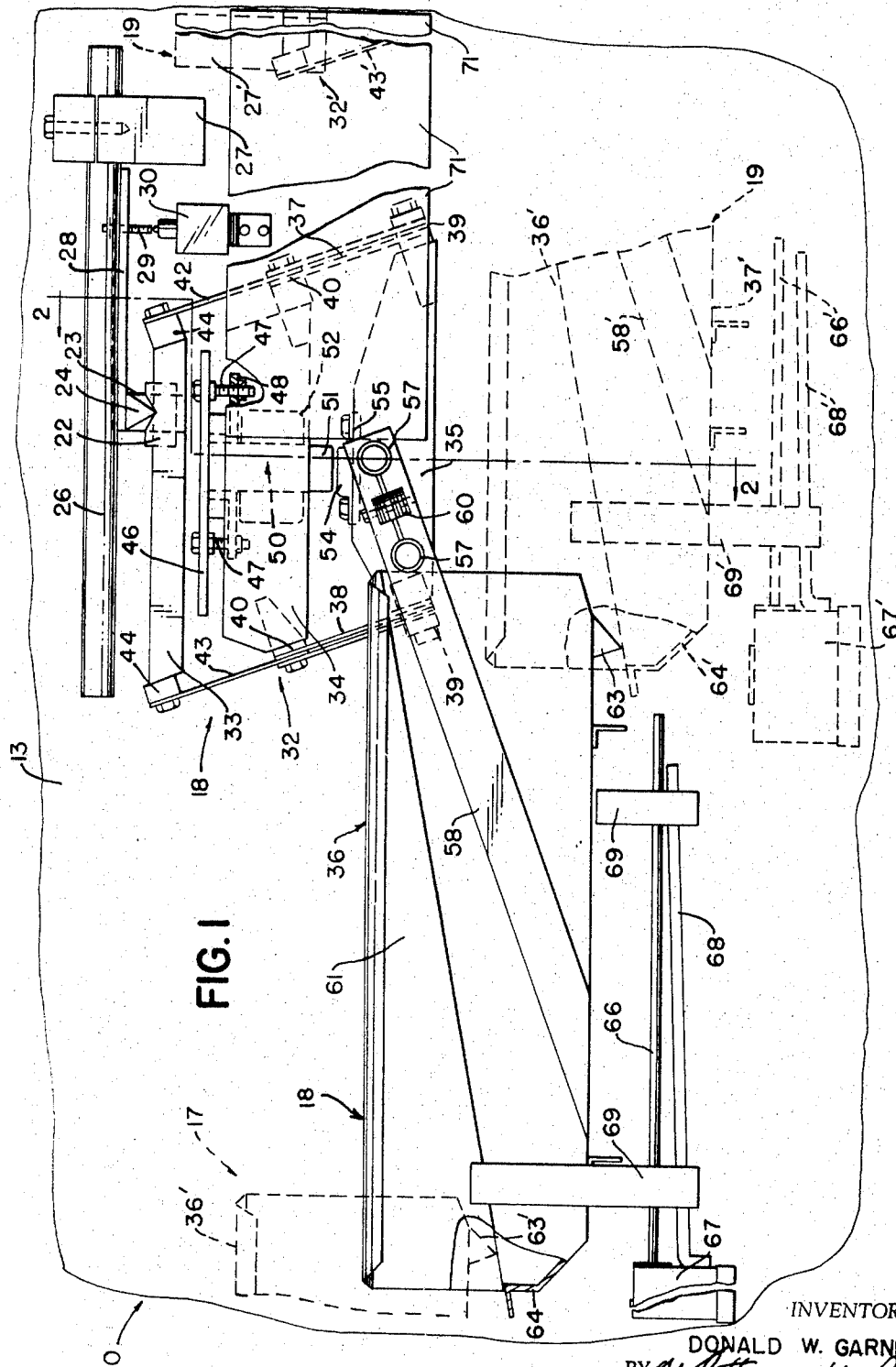

The present invention relates to improvements in a vibratory material supply structure or mechanism for feeding discrete, particulate, granular or powdery materials to a circumferentially spaced series of weigher heads of a rotary turret type of automatic weighing machine, such as is the subject matter of Letters Patent No. 3,156,311 to Olofsson and Garnett of Nov. 10, 1964. More particularly, the improvements relate to a multiple stage or cascade type of vibratory supply structure of the general sort illustrated and described in that patent.

Thus, it is an object of the invention to provide a staged or cascaded vibratory supply device in which several successive vibratory supply receptacles in the form of pans or trays, along with vibratory units operating each of the same to advance material therealong, are suspended by individual pivoted beam provisions, as in the Olofsson et al. patent. However, in accordance with the present improvement the support or suspension of the receptacles themselves from the thus hung vibratory units, as well as the support of a further vibratory, primary supply pan which is not beam-mounted, is effected in a novel way and by novel means to better balance the mass and weight of the vibratory pan and its suspension against the mass and weight of the components of its vibratory unit, also so as to properly locate the receptacles in overlapping succession for vibratory delivery of material from one to the next.

By the same token, the improved support of the primary vibratory supply receptacle better positions and centers the latter in relation to the discharge mouth of a basic gravity type supply hopper, from which a product to be weighed is received as the first incident of the multiple stage supply operation.

The hopper-furnished product is stably received, and advances vibratorily from the primary pan in sequence over say, three further beam-suspended and overlapped vibratory pans for ultimate discharge to the turret-supported weighing receptacles passing beneath the last pan of the succession.

In short, the entire assemblage of staged pans is very well balanced dynamically in the interest of securing a continuing smooth feed of product to the traveling weigher heads, and to that extent contributing to a reliable and minimum-reject operation of the heads.

More specifically, it is an object of the invention to provide a vibratory supply mechanism of the sort described, in which the suspension or support of the several vibratory supply pans is had through the agency of rigid elongated side bars or rods which incline gradually at a mild longitudinal and vertical angle from a fixed connection at one end to a frame part of the vibratory unit for the pan to a fixed connection to the pan at the other end. As the result, there is a considerable longitudinal spacing of each pan from its vibratory unit and its attendant mass, for the purpose mentioned above. That is, there is a balanced distribution of weight of the pan, its suspension and its contents against that of the vibratory weighing unit components, attended by a maximum compacting of the length of the installation from rear to front which is consistent with the desired type of suspension.

Specifically, and as herein illustrated, the beam balanced pans are suspended from above by elongated inclined bar means of the type described, while the non-beam balanced primary, hopper-fed supply unit is supported from beneath by its vibratory device by similar but upwardly inclined side bar means.

A further object of the invention is to provide a vibrational unit for a cascaded installation of the sort in question, in which improved provisions are made to readily and accurately adjust the air gap between electromagnetic core and armature components of the unit of the pan, thus facilitating the initial tuning and later adjustment of the unit.

It is a still further object of the invention to provide a vibratory supply device having a knife-edge or equivalent pivoted or floating suspension of the vibratory unit and its associated pan, in which the vibratory unit is equipped with relatively massive counterweight means to oppose inertial effects of the pan and elongated side bars which mount the same to the unit.

To recapitulate, the elongated side bars on which the vibratory receptacles ride have multiple advantages, i.e., in point of centering the primary, non-pivoted unit beneath the supply hopper, so as to most stably receive the continually oncoming charge of product or material; in point of locating the centers of gravity of the supply pans of each of the other units well out from the units fulcrum and the center of vibratory mass of the respective vibratory actuators and their counterweight means on the opposite side of the unit's fulcrum; and in point of cascading, first, second, third and fourth supply receptacles or pans in a very compact way, notwithstanding the lengths of the sets of side bars.

Yet another object is to provide a vibratory supply mechanism in which various optional means, available individually or in combination, are provided to initially or periodically tune the electrical vibratory unit. This may be done in a relatively coarse way by changing the width of the solenoid or electromagnetic core-armature air gap, and/or by an appropriate selection of the size, material or composition of certain leaf springs which hang the unit, or by varying the weight of the empty pan and its suspending means at a point adjacent the vibratory unit, thus to provide a fine vernier tuning adjustment. These selective provisions may also be supplemented by an electrical variation in the frequency and/or amplitude of vibration of the supply unit. Hence the latter is made responsive to any degree desired, depending on the product being handled, permissible weighing tolerance, etc.

The foregoing as well as other objects will become more apparent as this description proceeds, especially when considered in connection with the accompanying drawing illustrating the invention, wherein:

FIG. 1 is a fragmentary side elevational view, partially broken away and in vertical section, illustrating in solid line one of several staged or cascaded vibratory material supply units of the invention, parts of other similar component units in advance and to the rear of this mechanism being indicated in dotted lines.

Figure 2:
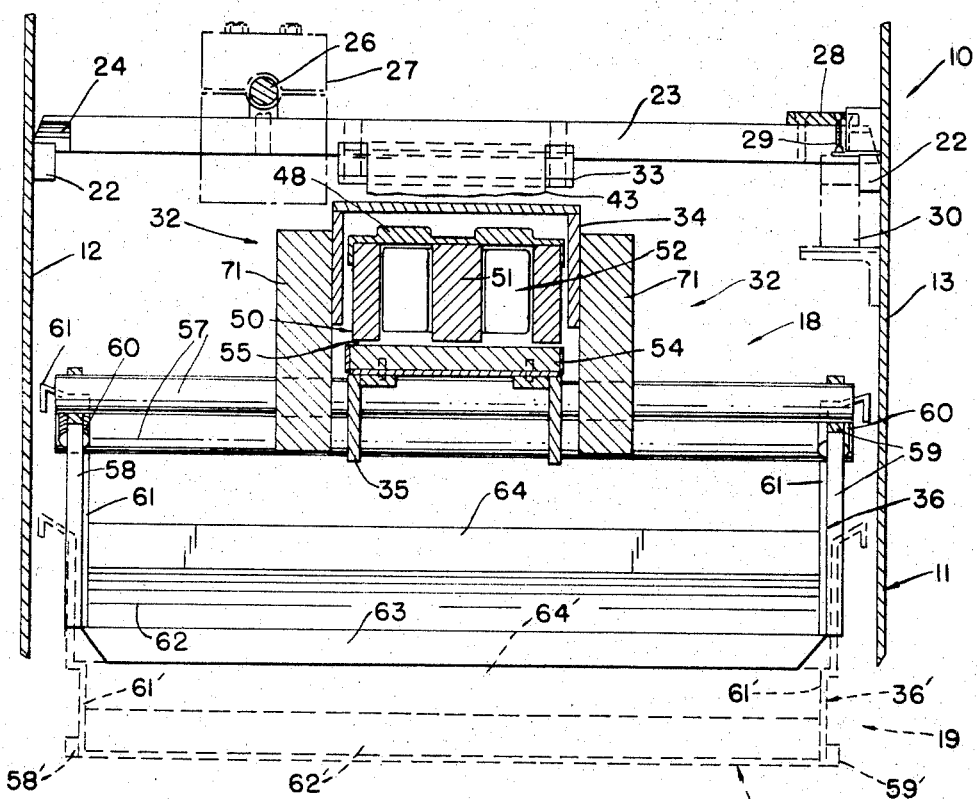
Figure 3:
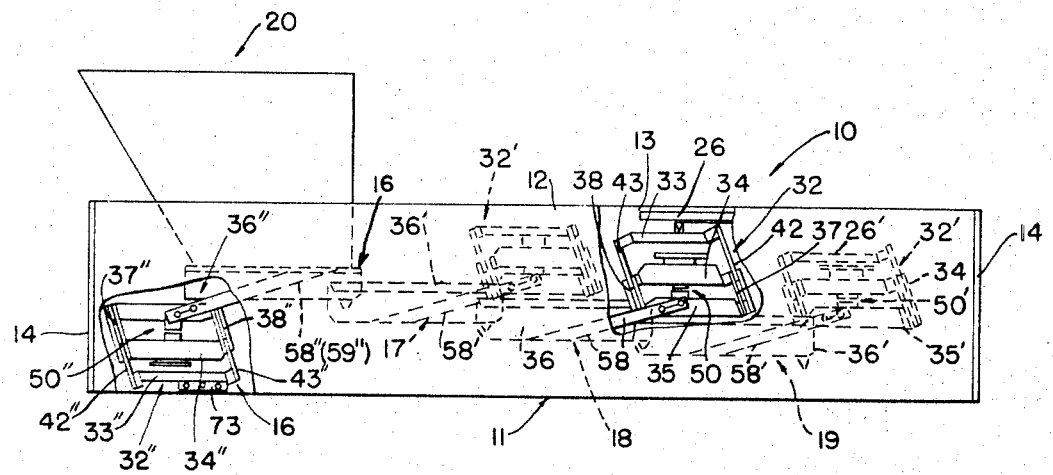

FIG. 2 is a view, also partially broken away, in vertical transverse cross-section along a line generally corresponding to the line 2—2 of FIG. 1, better showing features of the vibratory unit and pan structure of the apparatus; and FIG. 3 is a smaller scale, partially broken away view in side elevation of the cascaded vibratory material supply apparatus as a whole, main gravity hopper and primary vibratory supply units of the apparatus also being schematically illustrated.

Referring first to FIG. 3 of the drawing showing the supply structure 10 as a whole, it comprises an elongated rectangular enclosure 11, open at its top and bottom and defined by upright side walls 12, 13 and end walls 14. This structure internally receives, in rear-to-front progression, as from left to right in FIG. 3, a first or primary, hopper-supplied vibratory pan unit, geenrally designated by the reference numeral 16, and second, third and fourth vibratory pan units 17, 18, 19, respectively. The latter three are, as distinguished from the primary unit 16, provided with scale beam type of mounting means, to be described (although not full illustrated in detail in FIG. 3).

In the description to follow, the tertiary floating or beam-mounted vibratory pan unit 18 has been selected for the purpose of illustration and description in detail; but it is to be understood that the units 17 and 19 respectively rearward and forward thereof are similarly constituted. Hence their corresponding parts are designated by corresponding reference numerals, primed, and further description thereof will be dispensed with. As for the first or primary vibratory pan unit 16, its parts also resemble those of unit 18, save for the omission of a scale beam type of mount; and accordingly, components of unit 16 are designated, to the extent similar to the unit 18, by coresponding reference numerals, double primed.

The reference numeral 20 generally designates a supply hopper or bin positioned over the first vibratory unit 16, in a centered relationship to the latter to be hereinafter further described, for the initial feed to and from the unit of discrete, particulate or powdered material of many different sorts, such as potato chips and other flake-like granular edibles or powdery soap flakes, frozen foods, and the like, to the cascaded system of pan units 17–19.

Now referring to FIGS. 1 and 2, in which the selected third supply unit 18 is typically set out in solid lines in operative relation to the units 19 and 17 respectively forward and rearward thereof, the opposed side walls 12, 13 of the rectangular enclosure 10 each have a notched fulcrum block 22 fixed thereto at an appropriate elevation thereon, the blocks being transversely aligned; and a transversely elongated scale beam or fulcrum bar 23 has knife edges 24 at its ends resting in the notches of blocks 22. At an intermediate point along its transverse length (FIG. 2) the bar 23 has a longitudinally extending counterbalance rod 26 fixed thereon, which adjustably receives a counterweight 27 to bias the beam for an electrical control function.

Adjacent the right-hand end thereof (FIG. 2) the fulcrum or beam bar 23 also has a longitudinally extending plate 28 fixedly secured thereto; and plate 28 carries adjacent its free end an adjustable switch operating screw 29. This screw is adapted to contact the control button of a limit switch 30 in performing a function of electrical control detection and signaling of the weight of product traversing supply unit 18, none of which is germane to the present invention.

A component vibratory actuator unit of the pan mechanism 18 is itself generally designated by the reference numeral 32. Unit 32 comprises a first or upper rectangular frame part or member 33, which is fixedly connected to and suspended from a central part of the fulcrum bar 23; a second or intermediate rectangular frame member 34, which has certain provisions to adjust the core-armature gap of electromagnetic vibratory sub-unit 32 (to be described) and a third and bottom frame member 35, from which the supply pan or tray proper of the vibratory pan unit 18, designated 36, has its direct and rigidly connected supply or suspension.

In a manner generally similar to that illustrated in the above identified patent to Olofsson et al., the bottom vibratory frame 35 is flexibly hung from intermediate frame 34 by means of pairs of front and rear leaf springs 37, 38, respectively, which are fabricated of impregnated glass fiber laminae. Springs 37, 38 incline rearwardly and upwardly in parallel relation to one another from a fixed lower mount on frame member 35 at 39 to a fixed mount at 40 to intermedite frame member 34. The latter is in turn upwardly hung by single isolation leaf springs 42, 43 from front and rear connections at 44 to the upper frame member 33. The function of springs 42 and 43 is to in a great measure isolate the vibration of unit 32 from the knife-edge pivots of counterweight beam 23.

Leaf springs 37, 38, 42 and 43 are selected of suitable widths and lengths of the laminated, impregnated glass fiber material; and the number of springs in each set, the number of plies or laminae, or the thickness, length and/or width thereof are intended to be selected as best suited for the initial tuning and best subsequent operation of the vibratory unit 32.

Intermediate frame member 34 fixedly carries at its top an upwardly spaced, flanged part 46, from which three longitudinally spaced, rotative adjusting screws 47 depend; and these screws are, as shown in FIG. 1, threaded into a horizontal flange of a plate 48 with locknuts taken up on screws 47 beneath the flange, as shown in FIG. 1. As best shown in FIG. 2, the plate 48 supports the E-core structure 50 of an electromagnet or solenoid, whose center core part 51 is surrounded by the electromagnetic coil 52.

The armature piece 54 of the electromagnet is fixedly mounted atop the bottom frame member 35 of vibratory actuator 32; and it will be seen that the core structure 50 may be vertically adjusted as desired by a manipulation of screws 47 to regulate the width of air gap at 55 between it and armature 54. There is thus afforded a further means for conveniently tuning the unit 32 in a fairly coarse way, either at the initial set-up or periodically thereafter.

The invention, as indicated above, includes means for the improved support of the several supply pans 36 and 36' with the center of gravity substantially spaced laterally in the longitudinal sense from the knife-edge beam pivot at 24, in balance with the mass of the vibratory unit 32 and its associated counterweight provisions. To this end, the bottom frame member 35 of vibratory actuator 32 is provided, beneath armature 54, with a pair of horizontally elongated, transverse rods or tubes 57 extending through and equidistant on either side of frame member 35 to ends adjacent the respective enclosure side walls 12, 13, as shown in FIG. 2; and elongated, downwardly and rearwardly inclined side bars 58, 59 for the suspension of supply pan or tray 36 are fixedly clamped to the ends of cross members 57. A stack of replaceable weights 60, to provide for a fine tuning of the vibratory structure, is also clamped to one or both of the side bars in this zone within the confines of vibratory actuator 32.

Bars 58, 59 respectively parallel the walls 12, 13 and (FIG. 1) are of considerable length, inclining mildly downwardly and to the rear from their mount to frame 35 to a rigid connection, as by welding or the like, to the exterior of the side walls 61 of pan 36.

As shown in FIGS. 1 and 2, the pan 36 has a wide and flat bottom floor panel 62 extending longitudinally from a discharge lip 63 adjacent the open front of pan 36 rearwardly to an inclined retainer wall 64, above which the pan 36 is otherwise exposed at its rear to receive therewithin the overlapping lip 63' of the next forward supply pan 36', as illustrated in FIG. 1. Similarly the discharge lip 63 overlaps the rear retainer wall 64' of the next rearward pan.

In material supply operations handling products which should be heated to insure a desirable flowability thereof, the invention contemplates the provision, for each of the units 17, 18 and 19, of a Calrod-type resistance heating element 66 and its control unit 67. These may be appropriately supported fixedly, with the assistance of longitudinally extending plate or like means 68, as by brackets 69 fixedly hung from enclosure side walls 12, 13.

Referring to FIG. 2 in conjunction with FIG. 1, each of the beam-balanced vibratory pan units 17, 18, 19 is provided, on its vibratory actuator 32 or 32', with a pair of relatively massive, longitudinally elongated counterpoise plates 71. These are fixedly secured at the rear ends thereof (left in FIG. 1) to the intermediate frame member 34; and they are for the purpose of operating, in conjunction with the mass of the vibratory unit 32, to oppose inertial effects of the pan 36 and its suspending arms 58, 59.

In operation, upon energization of coil 52 of the electromagnet or solenoid of vibratory unit 32 with a rapidly pulsatory D.C. voltage, it will be seen that the alternate attraction of armature 54 upward and rightward (FIG. 1) to the electromagnetic core 50 will result in a transmission of vibratory reciprocation through and along side bars 58, 59 in the direction of their length to the supply pan 36. Material falling from the pan 36' of secondary unit 17 onto the pan 36 will in a controlled manner advance forwardly for discharge onto the pan 36' of the last supply unit 19.

The elongated inclined bars 58 properly space the successive receptacles in a forwardly and downwardly cascaded relation to one another. They also afford moment arm weight added to that of the pans 36 and 36' to balance that of the pivoted vibratory units 32, 32'; and the opposition of their inertia and that of the pans to a proper vibratory response of the flowing product is effectively nullified by the counter-balance masses 71.

Referring to FIG. 3, it is seen that the elongated side bars 58", 59" of the non-pivoted, first supply unit 16, in this case angling upward and to the right, furnish a support for the primary supply pan 36" which brings that pan in substantially centered position beneath the discharge mouth of the hopper 20. Thus the incoming product from the hopper is stably received in a relatively uniform weight distribution due to the support in question. This is of significance when it is borne in mind that as much as 240 pounds of product may be resting upon the primary pan 36", in the event of a substantially full hopper, and depending upon the nature of the product being handled. While the unit 16 is not provided with a scale beam type of balance, it is still important that its action be as little as possible affected by variations in weight and impact of the gravitating product.

FIG. 3 shows the primary vibrational unit 32" to be inverted, as compared with the corresponding other units 32, 32'. Its then lowermost frame member 33" is fixedly mounted to the side walls 12, 13 of enclosure 11, as by appropriate bracket means 73. The hopper or bin 20 is also mounted in fixed relation to the enclosure by appropriate means.

Thus, mounted, the primary supply pan unit 36 is supported from above by the side bar 58" and a corresponding bar 59" on the opposite side of the pan, in an overlapped feed-in relation to the pan 36' of the secondary supply unit 17, and that pan and corresponding receptacles of the third and fourth units 18 and 19 correspondingly overlap in a uniform manner.

What I claim as my invention is:

1. A vibratory material supply mechanism, comprising a vibratory unit, said unit having substantial mass and including means to flexibly connect said unit to a support for vibratory action relative to the latter, a material receiving receptacle adapted to discharge material longitudinally under vibratory agitation of the material, and an elongated bar member extending longitudinally from and supporting said receptacle from said vibratory unit at longitudinally spaced points on said bar member, in a location at a substantial distance of the center of gravity of the receptacle from said unit, said flexible connecting means including a single set of leaf springs connecting said vibratory unit to the support, the vibratory unit including parts mounted on said springs along the length of the latter, one of said parts receiving a vibratory action in one direction, said elongated bar member extending at a mild angle to the vertical from a fixed connection to said last named part to so locate the center of gravity of the receptacle, the vibratory action of the vibratory unit being transmitted from said last named part thereof to the receptacle by and in the direction of extent of said bar member, and at a substantial angle to the length of the leaf springs and the direction of said vibratory action of said last named part of the unit, and relatively massive counterweight means to oppose the inertial effect of said receptacle and bar member in vibration, comprising a member secured to said vibratory unit and extending therefrom oppositely of said bar member.

2. A vibratory material supply mechanism, comprising a vibratory unit, said unit having substantial mass and including means to flexibly connect the same to a support for vibratory action relative to the latter, a material receiving receptacle adapted to discharge material longitudinally under vibratory agitation of the material, and means extending longitudinally from and supporting said receptacle from said vibratory unit, at longitudinally spaced points on said last named means, in a location at a substantial distance of the center of gravity of the receptacle from said unit, said flexible connecting means including a set of leaf springs, the vibratory unit including parts mounted on said springs at spaced locations along the length of the latter and said longitudinally extending means being fixedly secured to one of said parts to extend at a substantial angle to the length of the leaf springs, the vibratory action of said unit being transmitted from said last named part to the receptacle by and in the direction of the length of said longitudinally extending receptacle supporting means.

3. The mechanism of claim 2, in which said longitudinally extending means comprises an elongated bar member secured at its opposite ends to said receptacle and said last named part of the vibratory unit and extending from that part at a mild angle to the vertical.

4. The vibratory material supply mechanism of claim 3, and further comprising relatively massive counterweight means on said last named part to oppose the inertial effect of said receptacle and said part in vibration.

5. The vibratory material supply mechanism of claim 4, in which said counterweight means comprises a member secured to said last named part of said vibratory unit and extending therefrom oppositely of said receptacle supporting bar member.

6. The vibratory material supply mechanism of claim 5, in which said set of leaf springs flexibly suspends the parts of said vibratory unit beneath said support.

7. A material supply structure in which there are a plurality of mechanisms in accordance with claim 6, said mechanisms being arranged in a longitudinally and vertically cascaded and overlapped relation of the receptacles thereof to one another for a vibratory discharge of material from one receptacle to another.

8. A material supply structure in which there are a plurality of mechanisms in accordance with claim 2, and mechanisms being arranged in a longitudinally and vertically cascaded and overlapped relation of the receptacles thereof to one another for a vibratory discharge of material from one receptacle to another.

9. A material supply structure in which there are a plurality of mechanisms in accordance with claim 4, and mechanisms being arranged in a longitudinally and vertically cascaded and overlapped relation of the receptacles thereof to one another for a vibratory discharge of material from one receptacle to another.

10. A material supply structure in which there are a plurality of mechanisms in accordance with claim 5, said mechanisms being arranged in a longitudinally and vertically cascaded and overlaped relation of the receptacles thereof to one another for a vibratory discharge of material from one receptacle to another.

11. The vibratory material supply mechanism of claim 2, and further comprising relatively massive counterweight means on said last named part to oppose the inertial effect of said receptacle and said part in vibration.

12. A material supply structure in which there are a plurality of mechanisms in accordance with claim 11, said mechanisms being arranged in a longitudinally and vertically cascaded and overlapped relation of the receptacles thereof to one another for a vibratory discharge of material from one receptacle to another.

13. The vibratory material supply mechanism of claim 2, in which said set of leaf springs flexibly suspends the parts of said vibratory unit beneath said support.

14. A material supply structure in which there are a plurality of mechanisms in accordance with claim 13, said mechanisms being arranged in a longitudinally and vertically cascaded and overlapped relation of the receptacles thereof to one another for a vibratory discharge of material from one receptacle to another.

15. A material supply structure in which there are a plurality of mechanisms in accordance with claim 2, said mechanisms being arranged in a longitudinally and vertically cascaded and overlapped relation of the receptacles thereof to one another for a vibratory discharge of material from one receptacle to another.

16. The supply structure of claim 15, in which said parts of each vibratory unit include a vibrator and an armature, and means to adjust the width of an air gap between the vibrator and armature.

17. The supply mechanism of claim 2, in which said parts of said vibratory unit include a vibrator and an armature, and means to adjust the width of an air gap between the vibrator and armature.

18. A vibratory material supply mechanism, comprising a vibratory unit, said unit having substantial mass and including means to flexibly connect the same to a support for vibratory action relative to the latter, a material receiving receptacle adapted to discharge material under vibratory agitation of the material, and means extending from and supporting said receptacle from said vibratory unit in a location at a substantial lateral distance of its center of gravity from said unit, comprising an elongated bar member secured at its opposite ends to said receptacle and unit, the vibratory action of the vibratory unit being transmitted to the receptacle by and in the direction of extent of said bar member, said bar member being biased by adjustable weight means adjacent its connection to said vibratory unit to afford a fine tuning adjustment of vibration of the mechanism.

19. A vibratory material supply mechanism, comprising a vibratory unit, said unit having substantial mass and including means to flexibly connect the same to a support for vibratory action relative to the latter, a material receiving receptacle adapted to discharge material under vibratory agitation of the material, and means extending from and supporting said receptacle from said vibratory unit in a location at a substantial lateral distance of its center of gravity from said unit comprising an elongated bar member secured at its opposite ends to said receptacle and unit, the vibratory action of the vibratory unit being transmitted to the receptacle by and in the direction of extent of said bar member, and relatively massive counterweight means to oppose the inertial effect of said receptacle and last named supporting means in vibration, comprising a member secured to said vibratory unit and extending therefrom oppositely of said receptacle supporting bar member, said bar member being biased by adjustable weight means adjacent its connection to said vibratory unit to afford a fine tuning adjustment of vibration of the mechanism.

References Cited
UNITED STATES PATENTS 2,437,214   3/1948   Tremblay.
2,446,752   8/1949   Fiddyment.

LAVERNE D. GEIGER, *Primary Examiner.*

EDWARD J. EARLS, *Assistant Examiner.*

U.S. Cl. X.R.

198—220; 222—55, 254